No. 624,726. Patented May 9, 1899.
G. A. ANDERSON.
SPRING WHEEL.
(Application filed Sept. 26, 1898.)
(No Model.) 2 Sheets—Sheet 1.
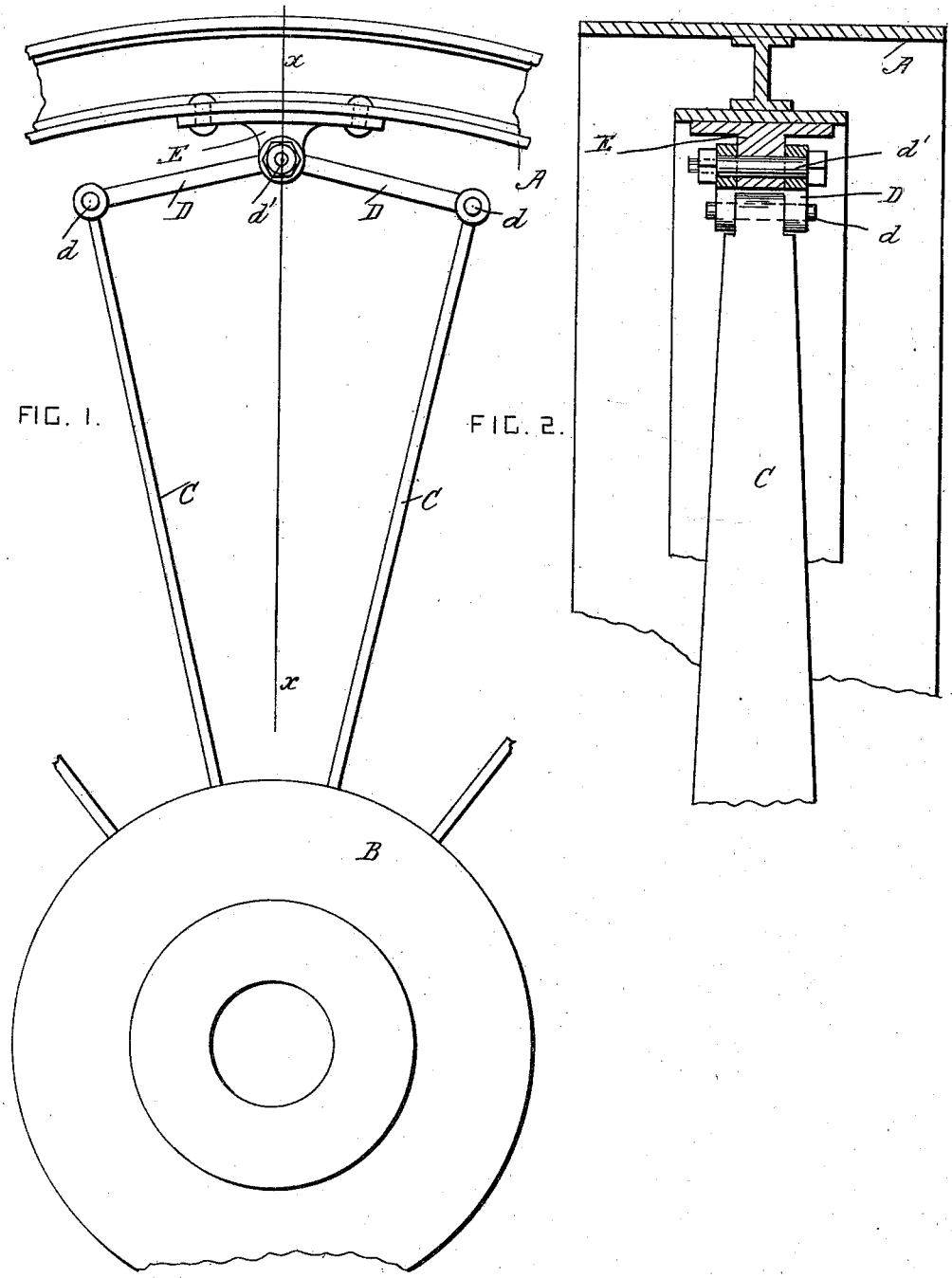
WITNESSES
INVENTOR
Gustaf A. Anderson
by Herbert W. Jenner.
Attorney.

No. 624,726. Patented May 9, 1899.
G. A. ANDERSON.
SPRING WHEEL.
(Application filed Sept. 26, 1898.)
(No Model.) 2 Sheets—Sheet 2.
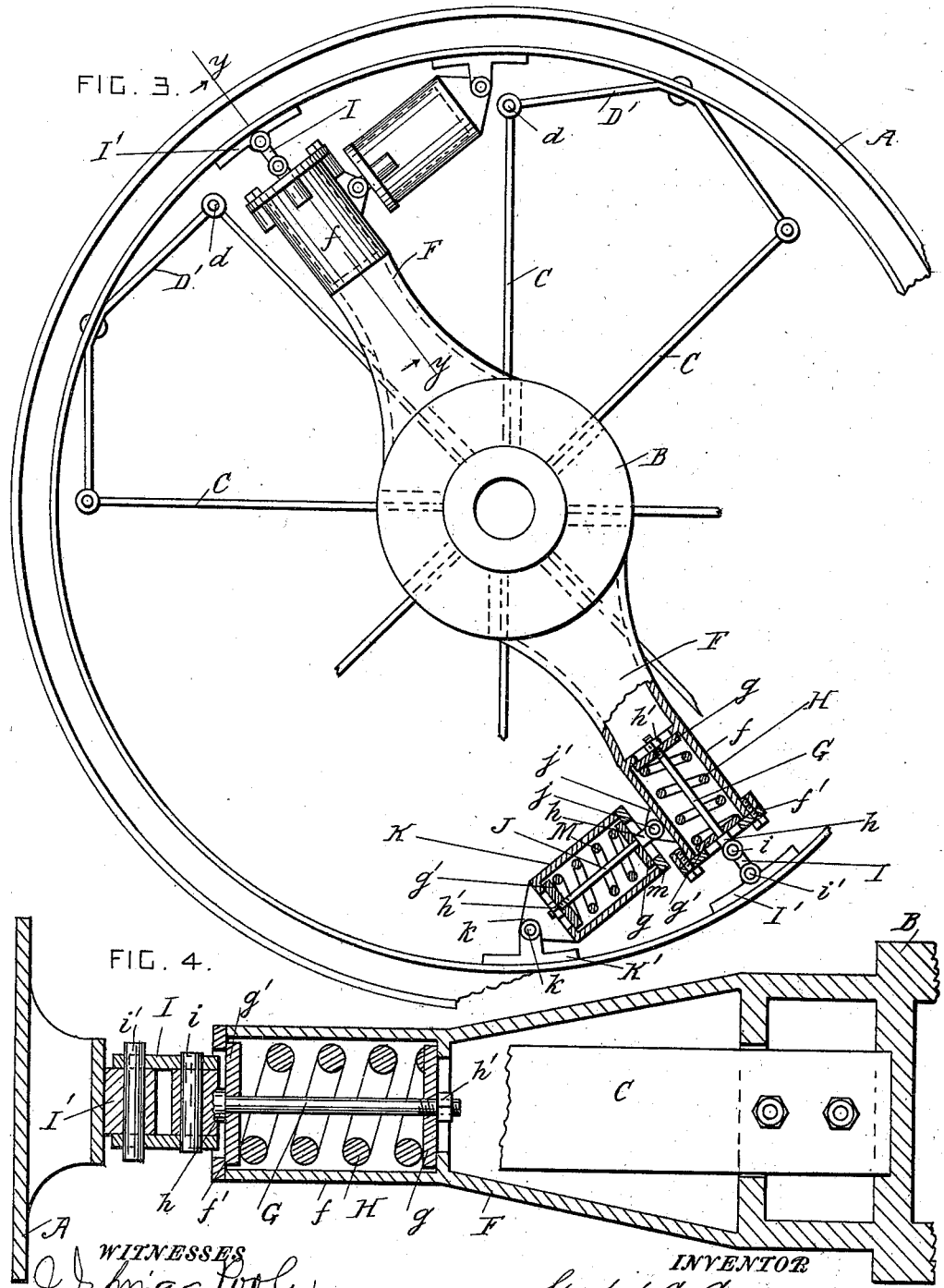

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

SPRING-WHEEL.

SPECIFICATION forming part of Letters Patent No. 624,726, dated May 9, 1899.

Application filed September 26, 1898. Serial No. 691,880. (No model.)

*To all whom it may concern:*

Be it known that I, GUSTAF ARVID ANDERSON, a citizen of the United States, residing at Waynesborough, in the county of Franklin and State of Pennsylvania, have invented certain new and useful Improvements in Spring-Wheels; and I do hereby declare the following to be a full, clear, and exact description of the invention, such as will enable others skilled in the art to which it appertains to make and use the same.

This invention relates to spring-wheels for traction-engines and other vehicles; and it consists in the novel construction and combination of the parts hereinafter fully described and claimed.

In the drawings, Figure 1 is a side view of a portion of a light and simple form of spring-wheel. Fig. 2 is a cross-section taken on the line $x$ $x$ in Fig. 1. Fig. 3 is a side view of a heavier form of wheel, showing also a modification. Fig. 4 is a section taken on the line $y$ $y$ in Fig. 3.

A is the rim of the wheel, and B is the hub, which is mounted on a shaft in any approved manner.

C are spring-spokes which are secured to the hub at one end. The spring-spokes are made of any approved resilient material, such as steel, and they are of any approved form. The free ends of the spokes are connected to the rim of the wheel in pairs by means of connections which are pivoted to the spokes and attached to the wheel-rim between each pair of spokes.

In the simple form of wheel shown in Figs. 1 and 2 the free ends of the spokes are connected to the rim by links D. The links D are pivoted to the spokes by pins $d$ at one end and are pivoted to brackets E by pins $d'$ at the other end. The brackets E are secured to the rim between the pairs of spokes in any approved manner, and the links of each pair extend from each bracket in opposite directions. When a load comes on the axle, all the spring-spokes bend, but in different proportions, according to their positions in the wheel, and when the wheel is used as a driving-wheel one half of the links push, while the other half pull, the rim around. The spring-spokes permit the rim and hub to have relative motion in the plane in which the wheel revolves, but prevent them from having relative motion laterally.

Instead of using links D to connect the spokes to the rim spring-bars D' can be used, as shown in Fig. 3. These spring-bar connections are pivoted to the spokes by pins $d$, the same as the links, and are rigidly secured to the rim between each pair of spokes. The spring-bars can be secured under a prearranged initial tension, if desired, to steady the action of the wheel.

In a traction-engine wheel and where a heavy load has to be driven the hub is preferably provided with one or more arms F, two arms being preferably used and arranged on opposite sides of the axle. Each arm F has a hollow cylinder or frame $f$ at its free end, which has a cover-plate $f'$ secured to it.

G is a bolt which is arranged in the cylinder and has two plates $g$ and $g'$ upon it, which plates are normally slidable toward each other. The bolt is provided with a shoulder or collar $h$, which prevents the plate $g'$ from moving too far outward, and $h'$ is a nut on the end of the bolt which prevents the plate $g$ from sliding too far inward. The plate $g$ normally abuts against the bottom of the cylinder $f$ and the plate $g'$ normally abuts against its cover-plate $f'$, holes being provided in the said bottom and cover for the passage of the said bolt.

H is a helical spring which is arranged in the cylinder $f$ between the plates $g$ and $g'$, and this spring is preferably confined under a prearranged initial tension.

I is a link or links pivoted to the bolt G by a pin $i$ and to a bracket I', secured to the wheel-rim by a pin $i'$. The link I is arranged substantially in line with the bolt G.

J is a bolt which is pivoted by a pin $j$ to a lug $j'$ on one side of the arm F. The bolt J is normally arranged at substantially a right angle to the said bolt G. The bolt J has two plates $g$ and $g'$ on it the same as the bolt G, and these plates are normally slidable toward each other. The bolt has a collar or shoulder $h$ to prevent the plate $g'$ from moving too far outward, and it has a nut $h'$ to prevent the plate $g$ from sliding too far inward.

K is a cylinder or frame having a lug $k$ on its bottom. This lug is pivoted to a bracket K′, secured to the wheel-rim by means of a pivot-pin k′. The cylinder K has a cover-plate m secured to it for the plate g to abut against, and the plate g′ abuts against the bottom of the cylinder.

M is a helical spring arranged in the cylinder or frame K between the plates g and g′ and preferably secured under a prearranged initial tension.

The helical springs are always in compression irrespective of the direction of motion of the wheel, and they transmit the driving strain as well as assist in supporting the constant load, according to their positions, as the wheel revolves.

What I claim is—

1. In a spring-wheel, the combination, with a rim, and a hub; of spring-spokes projecting from the hub and arranged in pairs, and driving connections pivoted to the free ends of each pair of the spokes and attached to the said rim between each said pair of spokes, substantially as set forth.

2. In a spring-wheel, the combination, with a rim, and a hub; of spring-spokes projecting from the hub and arranged in pairs, and connecting-links pivoted to the free ends of each pair of spokes, extending in opposite directions and pivoted to the rim by a single pin between each said pair of spokes, substantially as set forth.

3. In a spring-wheel, the combination, with a rim, a hub, and spring-spokes projecting from the said hub and operatively connected with the said rim; of an arm connected with the said hub, a helical spring carried by the free end portion of the said arm, a bolt operatively connected with the said spring, and a link pivotally connecting the said bolt with the wheel-rim, substantially as set forth.

4. In a spring-wheel, the combination, with a rim, a hub, and spring-spokes projecting from the said hub and operatively connected with the said rim; of a bolt arranged substantially radial of the axis of the wheel, a link pivotally connecting the said bolt with the rim, an inner and an outer plate normally slidable toward each other on the said bolt, a helical spring arranged between the said plates, and an arm connected with the said hub and provided with abutments for the opposite sides of the said plates, substantially as set forth.

5. In a spring-wheel, the combination, with a rim, a hub, and spring-spokes projecting from the said hub and operatively connected with the said rim; of a bolt arranged substantially radial of the axis of the wheel, a link pivotally connected with the rim, an arm connected with the said hub, a helical spring operatively connecting the said arm and bolt, a second bolt pivoted to the said arm and arranged at an angle to the first said bolt, a frame pivoted to the said rim, and a helical spring operatively connecting the last said bolt and the said frame, substantially as set forth.

6. In a spring-wheel, the combination, with a rim, of a hub provided with arms, spring connections arranged substantially radial of the axis of the wheel and operatively connecting the said arms with the wheel-rim, and spring connections arranged at substantially a right angle to the aforesaid connections and operatively connecting the said arms with the wheel-rim, substantially as set forth.

7. In a spring-wheel, the combination, with a rim, of a hub provided with an arm having a cylinder at its free end arranged substantially radial of the axis of the wheel, a cover for the said cylinder, a bolt slidable in the said cylinder and pivotally connected with the wheel-rim, plates normally slidable toward each other on the said bolt and bearing against the cylinder bottom and cover, and a helical spring arranged between the said plates, substantially as set forth.

8. In a spring-wheel, the combination, with a rim, and a hub provided with an arm; of a spring arranged with its axis substantially radial of the axis of the wheel, said spring being carried by the free end portion of the said arm, and a connection bearing against each end of the said spring and pivotally connected with the rim, substantially as set forth.

9. In a spring-wheel, the combination, with a rim, and a hub provided with an arm; of a helical spring carried by the free end portion of the said arm and confined under a prearranged initial tension, and a connection bearing against each end of the said spring and pivotally connected with the rim, substantially as set forth.

10. In a spring-wheel, the combination, with a rim, and a hub provided with an arm; of spring-spokes projecting from the hub and operatively connected with the rim, said spokes permitting the hub and rim to have relative motion in the plane in which the wheel revolves and preventing them from having relative motion laterally, and a spring connection carried by the said arm and operatively connected with the rim, substantially as set forth.

In testimony whereof I affix my signature in presence of two witnesses.

GUSTAF ARVID ANDERSON.

Witnesses:
DANIEL S. BEARD,
J. STOVER PRICE.